US012482149B2

United States Patent
Sun et al.

(10) Patent No.: US 12,482,149 B2
(45) Date of Patent: Nov. 25, 2025

(54) UNDER-SAMPLED MAGNETIC RESONANCE IMAGE RECONSTRUCTION OF AN ANATOMICAL STRUCTURE BASED ON A MACHINE-LEARNED IMAGE RECONSTRUCTION MODEL

(71) Applicant: Shanghai United Imaging Intelligence Co., Ltd., Shanghai (CN)

(72) Inventors: Shanhui Sun, Lexington, MA (US); Zhang Chen, Brookline, MA (US); Xiao Chen, Lexington, MA (US); Yikang Liu, Cambridge, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 380 days.

(21) Appl. No.: 18/130,150

(22) Filed: Apr. 3, 2023

(65) Prior Publication Data

US 2024/0331222 A1 Oct. 3, 2024

(51) Int. Cl.
   *G06T 11/00* (2006.01)
(52) U.S. Cl.
   CPC ........ *G06T 11/005* (2013.01); *G06T 2210/41* (2013.01); *G06T 2211/424* (2013.01)
(58) Field of Classification Search
   None
   See application file for complete search history.

(56) References Cited

U.S. PATENT DOCUMENTS

| | | | |
|---|---|---|---|
| 2011/0148410 A1* | 6/2011 | Zaitsev | G01R 33/5611 324/309 |
| 2014/0035576 A1* | 2/2014 | Li | G01R 33/5619 324/309 |
| 2015/0061671 A1* | 3/2015 | Greiser | A61B 5/055 324/309 |
| 2017/0309019 A1* | 10/2017 | Knoll | G01R 33/5611 |

(Continued)

OTHER PUBLICATIONS

Martinini et al., A Deep Learning Method for Optimal Undersampling Patterns and Image Recovery for MRI Exploiting Losses and Projections, in IEEE Journal of Selected Topics in Signal Processing, vol. 16, No. 4, Jun. 2022, pp. 713-724, doi: 10.1109/JSTSP.2022.3171082.*

(Continued)

*Primary Examiner* — Guillermo M Rivera-Martinez
(74) *Attorney, Agent, or Firm* — Zhong Law, LLC (57) ABSTRACT

Disclosed herein are systems, methods, and instrumentalities associated with magnetic resonance (MR) image reconstruction. An under-sampled MR image may be reconstructed through an iterative process (e.g., over multiple iterations) based on a machine-learning (ML) model. The ML model may be obtained through a reinforcement learning process during which the ML model may be used to predict a correction to an input MR image of at least one of the multiple iterations, apply the correction to the input MR image to obtain a reconstructed MR image, determine a reward for the ML model based on the reconstructed MR image, and adjust the parameters of the ML model based on the reward. The reward may be determined using a pre- (Continued)

trained reward neural network and the ML model may also be pre-trained in a supervised manner before being refined through the reinforcement learning process.

16 Claims, 6 Drawing Sheets

(56) References Cited

U.S. PATENT DOCUMENTS

| | | | |
|---|---|---|---|
| 2020/0034998 A1 | 1/2020 | Schlemper et al. | |
| 2020/0249300 A1* | 8/2020 | Sandino | G06N 3/084 |
| 2021/0003651 A1* | 1/2021 | Kamiguchi | G06N 3/045 |
| 2021/0158583 A1* | 5/2021 | Huang | G06T 11/005 |
| 2021/0177296 A1* | 6/2021 | Saalbach | G16H 30/40 |
| 2021/0217213 A1* | 7/2021 | Cole | G06N 3/088 |
| 2021/0224634 A1* | 7/2021 | Chen | G01R 33/56545 |
| 2022/0026514 A1 | 1/2022 | Chen et al. | |
| 2022/0222781 A1* | 7/2022 | Jacob | G06N 3/084 |
| 2022/0299588 A1* | 9/2022 | Zhu | G01R 33/5611 |
| 2022/0392122 A1* | 12/2022 | Preuhs | G01R 33/5608 |

OTHER PUBLICATIONS

Chen et al., Deep Learning for Image Enhancement and Correction in Magnetic Resonance Imaging—State-of-the-Art and Challenges, Journal of Digital Imaging 36, pp. 204-230 (2023), Feb. 2023, doi.org/10.1007/s10278-022-00721-9.*

Jeelani et al., Image quality affects deep learning reconstruction of MRI, 2018 IEEE 15th International Symposium on Biomedical Imaging (ISBI 2018), Washington, DC, USA, 2018, pp. 357-360, doi: 10.1109/ISBI.2018.8363592.*

Montalt-Tordera et al., Machine learning in Magnetic Resonance Imaging: Image reconstruction, Physica Medica, vol. 83, 2021, pp. 79-87, ISSN 1120-1797, doi: 10.1016/j.ejmp.2021.02.020.*

* cited by examiner

UNDER-SAMPLED MAGNETIC RESONANCE IMAGE RECONSTRUCTION OF AN ANATOMICAL STRUCTURE BASED ON A MACHINE-LEARNED IMAGE RECONSTRUCTION MODEL

BACKGROUND

Magnetic resonance imaging (MRI) is an important tool for investigating medical issues and planning treatments, but MRI scanning procedures are inherently slow due to the large amount of multi-dimensional data that need to be acquired. To accelerate an imaging process, techniques may be employed to under-sample an MRI data space (e.g., which may be referred to as k-space) and reconstruct an MRI image based on the under-sampled data. In recent years, deep learning (DL) based methods have been increasingly adopted in MRI reconstruction, but the images obtained using these methods often lack details (e.g., high-frequency details), causing the images to be blurry. Accordingly, systems and methods are desired to improve the quality of deep learning based MRI image reconstruction.

SUMMARY

Disclosed herein are systems, methods, and instrumentalities associated with MR image reconstruction. According to embodiments of the disclosure, an apparatus configured to perform the MR image reconstruction task may include at least one processor that may be configured to obtain an under-sampled magnetic resonance (MR) image of an anatomical structure and reconstruct the under-sampled MR image through multiple iterations based on a machine-learned (ML) image reconstruction model. The ML image reconstruction model may be learned through a training process (e.g., a reinforcement learning process) during which the ML image reconstruction model may be used to predict a correction to an input MR image obtained during at least one of the multiple iterations and generate a reconstructed MR image by applying the correction to the input MR image. A pre-trained ML reward model may then be used to determine a reward for the reconstructed MR image generated using the ML image reconstruction model, based on which the parameters of the ML image reconstruction model may adjusted, for example, with an objective to maximize the reward.

In some embodiments, prior to being trained in the training process described above, the ML image reconstruction model may be pre-trained in a supervised manner based on under-sampled MR training images and corresponding fully-sampled MR images, and the parameters of the ML image reconstruction model obtained from the supervised training may be refined during the training process described above. In other embodiments, prior to being trained in the training process described above, the ML image reconstruction model may be initialized with random parameters (e.g., without the supervised pre-training).

In some embodiments, prior to being used in the training process, the ML reward model may be pre-trained for predicting a quality of an MR image and generating an evaluation for the MR image based on the predicted quality. For example, the ML reward model may be pre-trained based at least on a first MR training image (e.g., an image being evaluated) and a second MR training image (e.g., a reference image) and, during the training of the ML reward model, the ML reward model may be used to extract respective features from the first MR training image and the second MR training image, and to predict the quality of the first MR training image based on a difference between those features. The training of the ML reward model may be conducted with or without a human input or annotation. For instance, if the second MR training image (e.g., the reference image) is known to have a higher quality than the first MR training image (e.g., the image being evaluated), then a human expert may not be needed. Otherwise, a human expert may be used during the training of the ML reward model to indicate (e.g., label or annotate) which of the first MR training image or the second MR training image is of a higher quality.

In some embodiments, the input MR image being corrected during the at least one of the multiple iterations may be an output of a preceding iteration of the multiple iterations and, as such, an under-sampled MR image may be refined iteratively based on the ML image reconstruction model to cover the large action space that may be associated with the MR image reconstruction task. In some embodiments, the ML image reconstruction model may be trained to learn, during the training process, a probability distribution of the correction applied to the input MR image and the reconstruction of the under-sampled MR image may be performed based at least on a sample mean and a sample variance drawn from the probability distribution. In some embodiments, the ML image reconstruction model may be trained to learn, during the training process, a mean associated with the correction applied to the input MR image and the reconstruction of the under-sampled MR image may be performed based at least on the mean (and/or a constant variance applicable to the mean).

In some embodiments, the correction described herein may include a map (e.g., a correction or error map) that may include a plurality of correction values to be applied to respective pixels of the input MR image. In some embodiments, the ML model may be implemented via a recurrent neural network, a cascaded neural network, or other types of neural networks having an iterative structure.

BRIEF DESCRIPTION OF THE DRAWINGS

A more detailed understanding of the examples disclosed herein may be had from the following description, given by way of example in conjunction with the accompanying drawing.

DETAILED DESCRIPTION

The present disclosure is illustrated by way of example, and not by way of limitation, in the figures of the accompanying drawings. A detailed description of illustrative embodiments will now be provided with reference to the figures. Although these embodiments may be described with certain technical details, it should be noted that the details are not intended to limit the scope of the disclosure. And while some embodiments may be provided in the context of magnetic resonance imaging (MRI), those skilled in the art will understand that the techniques disclosed in those embodiments can also be applied to other types of medical images such as, e.g., X-ray images, computed tomography (CT) images, photoacoustic tomography (PAT) images, etc.

Figure 1:
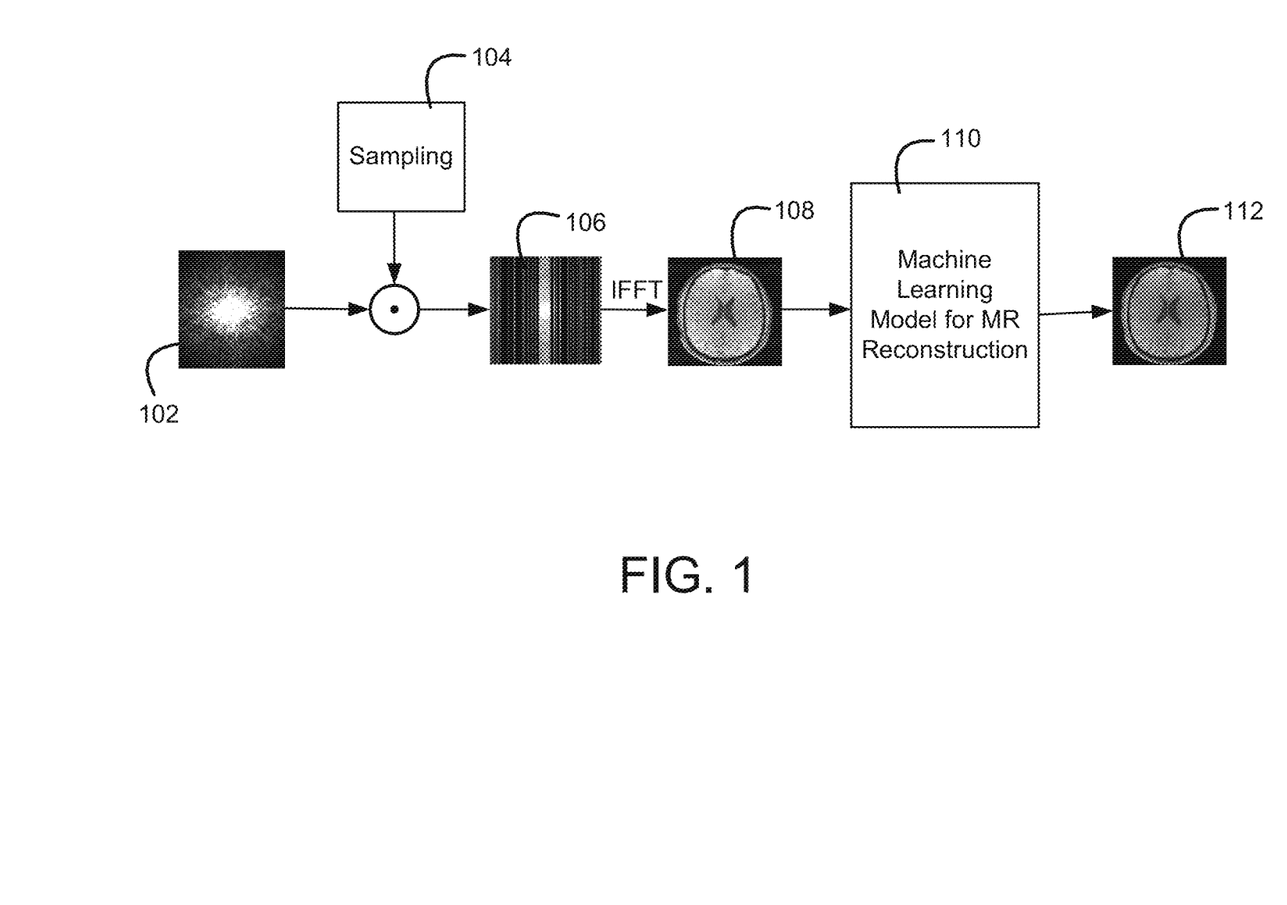
FIG. 1 is a simplified block diagram illustrating example operations that may be associated with MR image reconstruction according to one or more embodiments of the present disclosure.

FIG. 1 illustrates example operations that may be associated with MR image reconstruction. As shown, MR images (e.g., two-dimensional (2D) or three-dimensional (3D) MR images) of an anatomical structure (e.g., such as a human brain, a human heart, etc.) may be generated based on spatial, frequency, and/or phase information collected by an MRI scanner. Such information may be referred to herein as a k-space, k-space data, or k-space information, as illustrated by 102 of FIG. 1. An MR image (e.g., a fully-sampled MRI image) of the anatomical structure may be generated by fully sampling the k-space, but such a process may be prohibitively slow (e.g., due to physical limitations of the MRI scanner) to accommodate clinical needs. To accelerate the imaging process, a sampling pattern (e.g., sampling pattern 104 shown in FIG. 1) may be used to under-sample the k-space and obtain under-sampled MRI data 106 based on the under-sampling. Sampling pattern 104 may include, for example, a sampling mask that may indicate where data should be collected from k-space 102.

Once collected, under-sampled MRI data 106 may be converted into an under-sampled MR image 108, for example, by applying an inverse fast Fourier transform (IFFT) to the under-sampled MRI data. Conversely, based on an under-sampled MR image (e.g., MR image 108), corresponding MRI data may be obtained by applying a fast Fourier transform (FFT) to the under-sampled MR image. Because these transformations are mutually invertible, the terms "under-sampled MRI data" and "under-sampled MRI image" may be used interchangeably herein without affecting the applicability and scope of the disclosure.

The under-sampling operation described above may cause the resulting image 108 to miss certain details (e.g., high-frequency details) and/or exhibit aliasing artifacts. To recover the missing details and/or to reduce the artifacts, under-sampled MR image 108 may be subject to an image reconstruction process during which a machine learning (ML) model 110 may be used to enhance the quality of under-sampled MR image 108 through an iterative process to obtain a reconstructed image 112 that may resemble a fully-sampled MR image. The MR image reconstruction process may be formulated as an inverse problem represented by y=Ax+ϵ, where y may correspond to the under-sampled k-space, A may correspond to a system matrix, x may correspond the reconstructed image, and ϵ may represent noise. This inverse problem may be solved using a regularization term, e.g., as illustrated below:

$$\operatorname{argmin}_x \frac{1}{2}\|y - A(x)\|_2^2 + R(x)$$

where R may represent the regulation term.

In the formula above, if R is differentiable, reconstructed image x may be derived using a gradient descent based ML model or optimizer, whose functionality may be represented by the equation below:

$$\hat{x}^{(k+1)} = \hat{x}^{(k)} + \alpha \left[ A^T \left( y - A\hat{x}^{(k)} \right) + \nabla R(\hat{x}^{(k)}) \right]$$

Such an ML model or optimizer may be implemented using an artificial neural network (ANN) such as, e.g., a recurrent neural network (RNN), a neural ordinary differential equation (ODE) network, or a cascaded neural network, through which an under-sampled input image x may be refined iteratively to obtain reconstructed image x. In examples, to maintain consistency between reconstructed image x and the corresponding acquired k-space data, the ANN may include a data consistence layer or component that may be configured to ensure that, if the reconstructed image is transformed back to the k-space (e.g., via FFT), the data derived through the transformation is consistent with the original k-space data (e.g., input image 102, output image 112, and/or an error map described herein may contain a real part and an imaginary part). In examples, the ANN may be trained based on a supervised approach using fully sampled MRI data as ground truth and/or using a mean squared error (MSE) or mean absolute error (MAE) based loss function. Conducting the training based on an MSE or MAE loss, however, may result in the reconstructed image being a pixel-wise average of multiple possible solutions and may produce an over-smoothing effect. Further, due to a lack of synchronized under-sampled and fully-sampled MRI data (e.g., fully-sampled MRI data may not be collected at the same time that under-sampled MRI data is collected), computer-simulation may be used to generate under-sampled MR images (e.g., based on a fully-sampled image) for the training. These computer-simulated images, however, may have a different distribution than images produced by a real MR scanner and the mismatched distributions may negatively impact the quality of the images produced by the trained neural network (e.g., the ML model) at a subsequent inference time (e.g., when given real data).

A reinforcement learning (RL) based approach may be adopted to improve the robustness and accuracy of a machine-learned image reconstruction model (e.g., the term "machine-learned model" may be used interchangeably with the term "machine learning model," "artificial intelligence (AI) model," "neural network," or "neural network model"). Such an approach may, for example, solve the problems described herein with respect to the over-smoothing effect or the lack of ground truth for (e.g., lack of fully-sampled MRI data that correspond to) under-sampled MR images. In examples, the reinforcement learning approach may involve an actor (e.g., the MR reconstruction neural network described above), a critic (e.g., an ML reward model or neural network described in greater detail below), and/or an environment with which the actor may interact. The environment may provide a reward and/or a new state based on the action of the actor and the actor may learn to perform a task (e.g., MR reconstruction) based on the reward it receives from the critic as a result of the action. Using these techniques, the MR reconstruction task described herein may be formulated as a continuous Markov decision process (MDP) illustrated by the following equation:

$$\hat{x}^{(k+1)} = \hat{x}^{(k)} + G(\hat{x}^{(k)}, \theta)$$

where G may represent a model for predicting corrections or residuals (e.g., pixelwise/voxel-wise changes) in the (k+1)-th iteration (or step) given a reconstructed or recovered MR image obtained in the k-th iteration (or step). Model G may be implemented through a neural network (e.g., an iterative network such an RNN, a cascaded neural network, etc.), which may be trained based on the reinforcement learning techniques described above. In some examples, the image reconstruction neural network (e.g., ML image reconstruction model) may be trained first (e.g., pre-trained) using a supervised approach (e.g., based on under-sampled MR training images and corresponding fully-sampled images as ground truth) to obtain initial or preliminary parameter $\theta_0$ for the neural network and those parameters may then be fine-tuned using the reinforcement learning techniques described herein (e.g., based on reward provided by an ML reward model or neural network). In other examples, the supervised training (e.g., pre-training) may be skipped and the image reconstruction ML model (or neural network) may be trained directly (e.g., with randomly initialized model parameters) using the reinforcement learning techniques.

Figure 2:
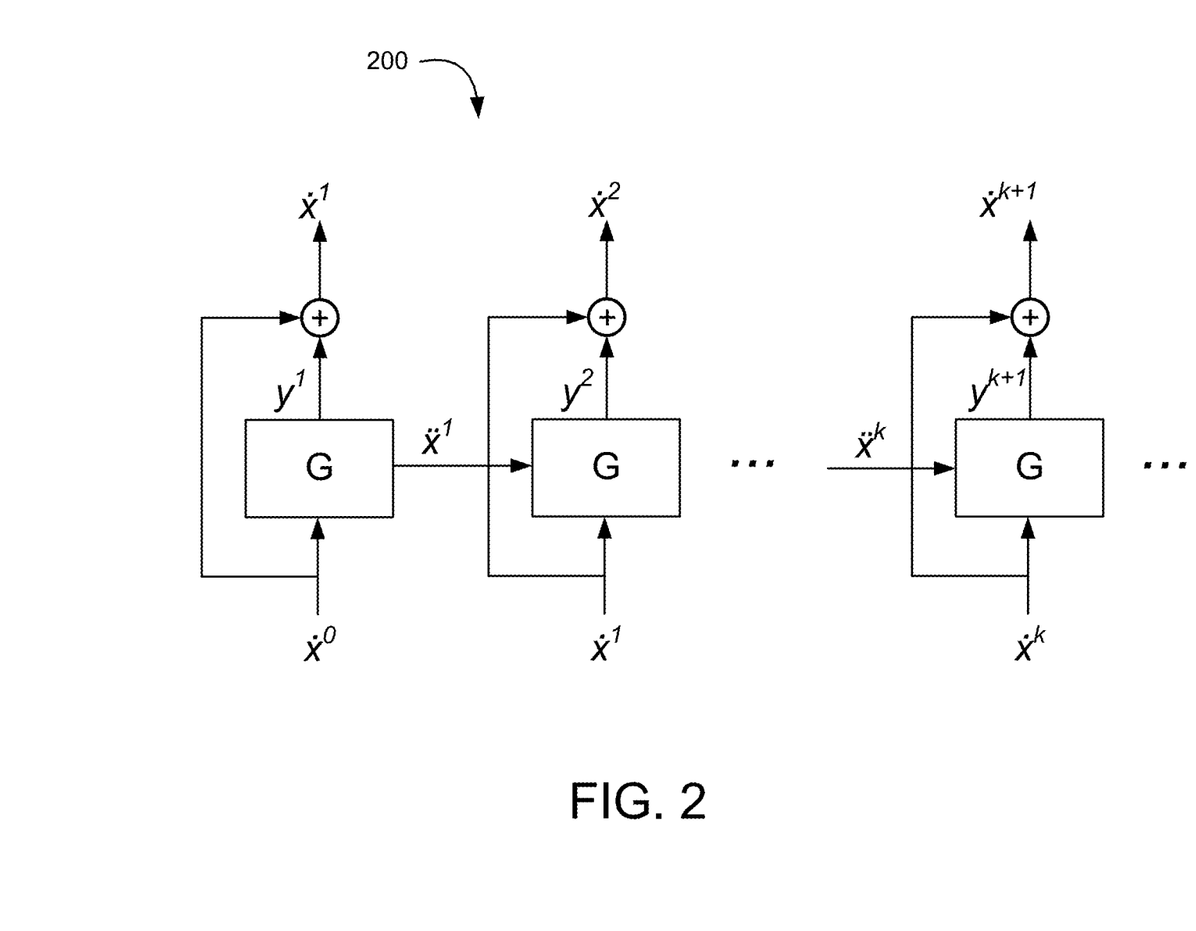
FIG. 2 is a simplified block diagram illustrating an example of an artificial neural network that may be used to perform an MR image reconstruction task in accordance with one or more embodiments of the present disclosure.

FIG. 2 illustrates an example of an ANN 200 (e.g., an ANN used to implement ML model 110 of FIG. 1) that may be used to perform an MR image reconstruction task in accordance with embodiments of the present disclosure. As shown in FIG. 2, ANN 200 may have an iterative structure and may be configured to generate a reconstructed MR image based on an under-sampled MR image (e.g., $\hat{x}^0$) through multiple iterations or iterative steps. During an iteration or iterative step k, ANN 200 may be configured to receive an input MR image $\hat{x}^{(k-1)}$ (e.g., an initial under-sampled MR image or an intermediate MRI image generated in a preceding iteration) and predict, based on an ML model G implemented through ANN 200, a correction map $y^k$ (also referred to as an action map or an error map) that may represent a refinement (e.g., pixel-wise refinement) to the input MR image. The correction map may be applied to the input MR image $\hat{x}^{(k-1)}$ to derive an MR image $\hat{x}^{(k)}$ as an output of the current iteration or iterative step, and the output MR image may be provided as an input to the next iteration for further refinement. Such an iterative reconstruction process may alleviate the difficulty associated with converging the ANN (e.g., due to the large action space associated with an MDP process), and the number of iterations may be adjusted (e.g., configurable) based on requirements and/or constraints associated with a specific image reconstruction task, such as, e.g., a desired processing speed and/or quality, capabilities of the computing devices used, quality and quantity of the training data available, etc.

In some examples, the correction (e.g., action) predicted during each iteration of the iterative process may include a first component (e.g., a first channel) corresponding to a mean or average correction map (e.g., mean or average action map) and a second component (e.g., a second channel) corresponding to a variance map representing variability of the correction from the mean or average map. In other examples, the correction (e.g., action) predicted during each iteration of the iterative process may only include a mean or average correction map, and a constant variance map (e.g., which may include predetermined constant variance values and, in some instances, variance values of zero). As will be described in greater detail below, either or both the mean correction map and the variance map may be learned through training, for example, as a Gaussian distribution. In the case where both the mean correction map and the variance map are learned through the training (e.g., as a Gaussian distribution), ANN 200 may, at an inference time, make a stochastic prediction of the correction during each iteration of the iterative reconstruction process by sampling from the learned distribution based on a corresponding mean correction map and a corresponding variance map. In the case where only the mean correction map is learned through the training (e.g., with a variance map of predetermined constant values), ANN 200 may, at the inference time, make a deterministic prediction of the correction during each iteration of the iterative reconstruction process based on the learned mean correction map.

ANN 200 may employ a recurrent neural network (RNN) structure, a cascaded neural network structure, or other types of neural network structures that are iterative in nature. Using an RNN as an example (e.g., as shown in FIG. 2), the RNN may include an input layer, an output layer, a plurality of hidden layers (e.g., convolutional layers), and connections that feed the hidden layers back into themselves (e.g., the connections may be referred to as recurrent connections). The recurrent connections may provide the RNN with visibility of not just the current data sample the RNN has been provided, but also previous hidden states. The feedback loop of the RNN may be visualized as multiple copies of a neural network, with the output of one serving as an input to the next. As such, the RNN may use its understanding of past events to process a current input rather than starting from scratch every time. In examples, the RNN may include a plurality of convolutional layers, each of which may, in turn, include a plurality of convolution kernels or filters having respective weights (e.g., corresponding to the parameters of a ML model implemented through the RNN) that may be configured to extract features from an input MR image (e.g., an under-sampled MR image). The convolution operations may be followed by batch normalization and/or an activation function (e.g., such as a rectified linear unit (ReLu) activation function), and the features extracted by the convolutional layers may be down-sampled through one or more pooling layers and/or one or more fully connected layers to obtain a representation of the features, e.g., in the form of a feature map or a feature vector. In examples, the RNN may further include one or more un-pooling layers and one or more transposed convolutional layers. Through these un-pooling layers and/or transposed convolutional layers, the features extracted from the input image may be up-sampled and further processed (e.g., through a plurality of deconvolution operations) to derive an up-scaled or dense feature map or feature vector. The dense feature map or vector may then be used to predict a correction that may be applied to an image generated from a previous iteration to obtain a refined MR image.

Figure 3:
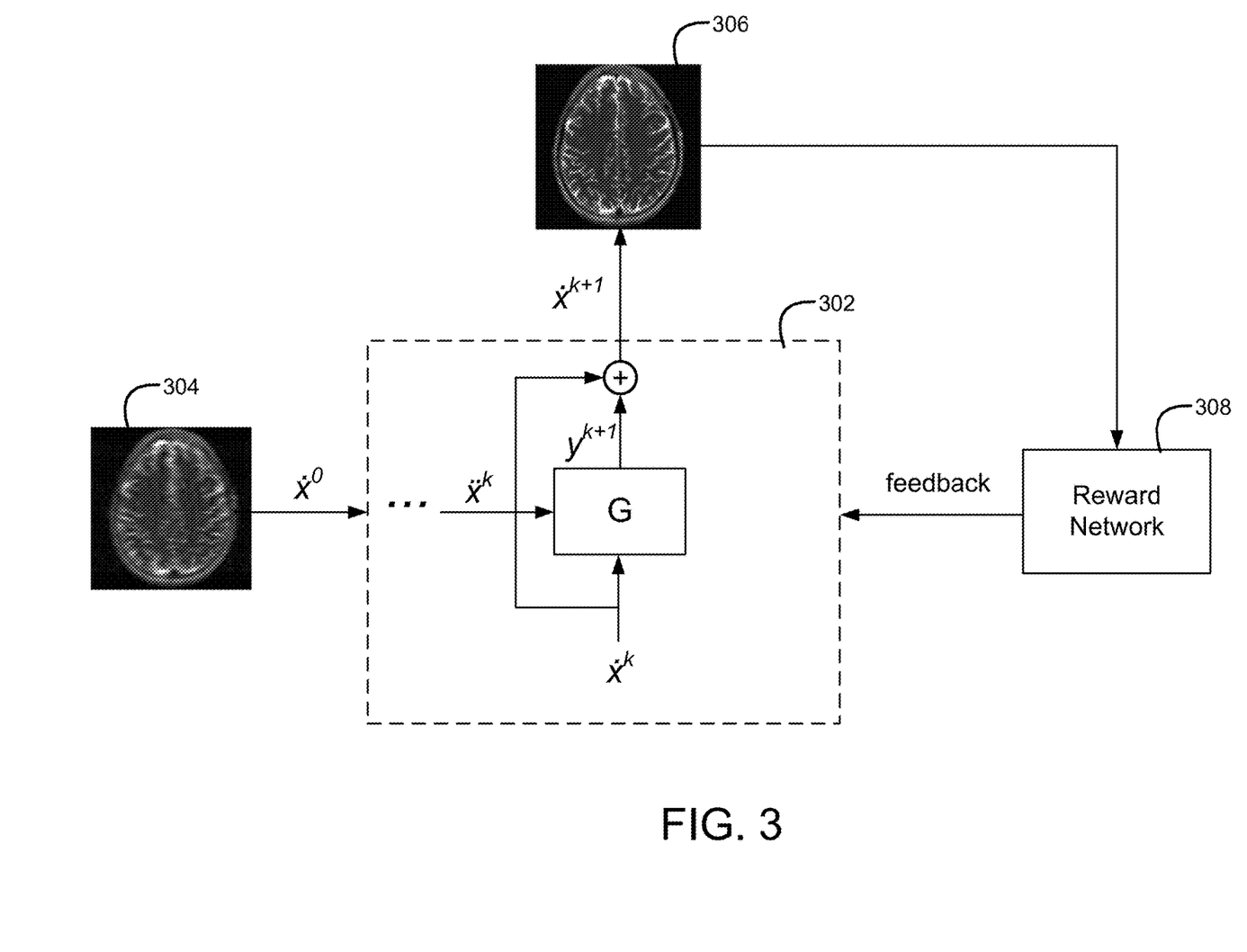
FIG. 3 is a simplified block diagram illustrating an example process for training an MR reconstruction neural network in accordance with one or more embodiments of the present disclosure.

The parameters of ANN 200 (e.g., of the ML model implemented through the ANN) may be learned via a training process during which one or more reinforcement learning techniques may be applied. FIG. 3 illustrates an example of training an MR reconstruction neural network 302 (e.g., ANN 200 of FIG. 2) based on such a training process. As shown in FIG. 3, the training may include providing an under-sampled MR training image 304 to reconstruction neural network 302 and processing, based on present parameters of the ML model implemented by the neural network, the under-sampled MR training image over multiple iterations (e.g., k+1 iterations) to obtain a reconstructed MR image 306. As described herein, during each iteration of the iterative reconstruction process, reconstruction neural network 302 may be configured to receive an input MR image (e.g., the initial training image 304 or an intermediate MR image reconstructed during a previous iteration) and predict a correction map $y^k$ (e.g., k=1, 2 ... k+1) to be applied to the input MR image. Reconstruction neural network 302 may, for example, obtain correction map $y^k$ by sampling it from a Gaussian distribution (e.g., the correction map may include a mean correction map and/or a variance map associated with the Gaussian distribution). Reconstruction neural network 302 may then apply the correction map to the input MR image of an iteration (e.g., through pixel-wise operations) to derive a refined MR image (e.g., as a final reconstructed MR image or an intermediate MR image) as an output of the iteration.

The MR image(s) produced (e.g., predicted) during one or more (e.g., each) of the iterations described above may be evaluated by a reward neural network 308 that may be pre-trained (e.g., trained before reconstruction neural network 302) for assessing the quality of the predicted MR image(s) and determining a reward for the reconstruction neural network based on the assessment. The parameters of the reconstruction neural network (e.g., of the ML model implemented by the neural network) may then be adjusted (e.g., via backpropagation) in accordance with the determined reward.

Figure 4A:
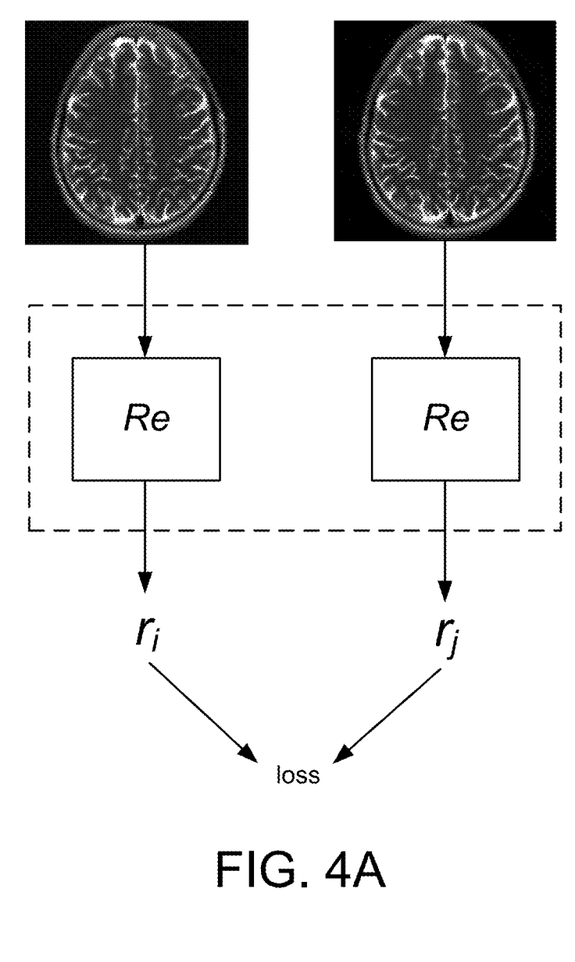
FIG. 4A is a simplified block diagram illustrating an example of a reward neural network in accordance with one or more embodiments of the present disclosure.

FIG. 4A illustrates an example of a reward neural network Re (e.g., an ML reward model) as described herein and an example method for training the network. As shown in the example, the reward neural network may be trained using a training dataset comprising paired images (i,j), where image i (e.g., a fully-sampled MR image) may be known to have a higher quality than image j (e.g., a reconstructed MR image). The reward neural network may employ a twin network structure such as a Siamese structure, even though other neural network structures may also be used. In examples, the network may include a classification network (e.g., a convolutional neural network such as a visual Geometry group (VGG) network or a residual neural network (Resnet)) as a backbone, with one or more convolutional layers configured to track features $r_i$ and $r_j$ from image i and image j, respectively, and one or more additional layers (e.g., last layers of the network) configured to generate a value (e.g., a one-dimensional value) representing the evaluated quality of image j compared to image i. Such a value (e.g., an evaluation score) may be determined, for example, as a loss between the respective features extracted from images i and j (e.g., based on a ranking loss $\log(\sigma(r_i-r_j))$, and the loss may be used to adjust the parameters of the reward neural network, for example, by backpropagating a gradient descent of the loss through the reward neural network.

In examples, the training of the reward neural network may be conducted using a human expert's evaluation as a reference, or using a combination of image-based and human-based references. For example, the human expert may label, between the pair of images (i,j) described herein, which one has a higher image quality and a loss between the images may be calculated accordingly using the example method described above. It should be noted here that, in calculating the loss, if the assumption is for image i be have a better quality than image j, then the loss may be calculated as $-\log(\sigma(r_i-r_j))$ such that parameters of the reward neural network may be optimized by minimizing the loss.

Reverting to FIG. 3, reconstruction neural network 302 may be trained (e.g., refined from previous, supervised training) using policy gradient based techniques (e.g., the iterative ML model G may operate as a policy maker or actor), with the assistance of the reward neural network 308. Each pixel/voxel in the correction map $y^k$ predicted (e.g., based on sampling from a Gaussian distribution) by the reconstruction neural network (e.g., which may be considered as a policy neural network) may represent a continuous action in the action space of the MR reconstruction task, and a probability distribution of the action space may be learned through the training process.

Figure 4B:
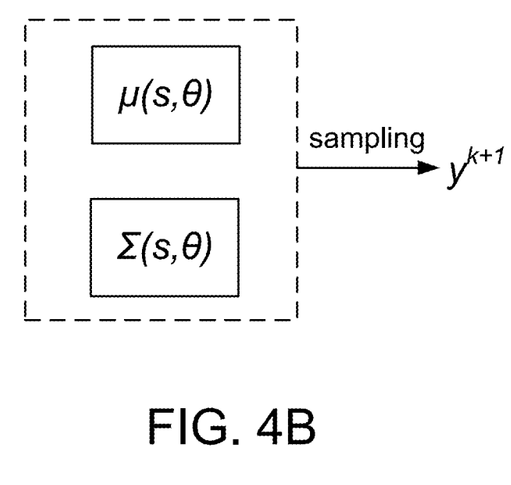
FIG. 4B is a diagram illustrating an example of determining a correction map based on a multivariate normal distribution in accordance with one or more embodiments of the present disclosure.

In some embodiments, the probability distribution may be a Gaussian distribution and the correction maps (e.g., actions or policies) predicted by reconstruction neural network 302 may be defined as follows:

$$\pi(a \mid s, \theta) \stackrel{def}{=} N\left(a; \mu(s, \theta), \sum(s, \theta)\right)$$

where $\mu(s,\theta)$ may represent a mean correction map of the distribution and $\Sigma(s, \theta)$ may represent a variance map of the distribution. In these embodiments, neural network 302 may be configured to generate a two-channel output, with one channel for the mean correction map and the other channel for the variance map. During a subsequent inference task, the action (e.g., correction map) taken at an iteration of the iterative reconstruction process may be determined stochastically by sampling from the normal distribution based on the mean action map and the variance action map. In some embodiments, neural network 302 may be configured not to predict the variance map $\Sigma(s,\theta)$ and to predict only the mean correction map $\mu(s,\theta)$. In these embodiments, the action (e.g., correction map) taken at an iteration of the iterative reconstruction process during inference may be selected deterministically based on the mean correction map and/or by applying a pre-determined (e.g., empirically determined) constant value as a variance of the mean correction map. FIG. 4B illustrates an example of determining a correction map $y^{k+1}$ to be applied during an iterative reconstruction process based on a mean correction map $\mu(s,\theta)$ and a variance map $\Sigma(s, \theta)$ associated with a learned Gaussian distribution, as described herein.

In some embodiments, neural network 302 may be configured not to predict the variance map $\Sigma(s,\theta)$ and to predict only the mean correction map $\mu(s,\theta)$. In these embodiments, the action (e.g., correction map) during an interference task (e.g., at each iteration of an iterative reconstruction process) may be selected deterministically based on the mean correction map (e.g., as an alternative to the stochastic approach described above).

In examples, if reconstruction neural network 302 is pre-trained using a supervised training approach before going through the reinforcement learning process described herein, the same number of recurrent iterations used during the supervised training may be used in the reinforcement learning process and the reinforcement learning may have a fixed episode length (T). The image recovered or reconstructed during any part of the iterative process (e.g., during any iteration or after completing all of the iterations) may be evaluated using the reward neural network. For example, using the reward neural network or ML model, a reward (e.g., an evaluation score) may be determined for the MR image reconstructed during the iterative process and used to update the parameters of the reconstruction neural network, e.g., by backpropagating a gradient ascent associated with the reward through the network with an objective to maximize the reward. Various policy gradient based reinforcement techniques may be used to train the reconstruction neural network. These may include, for example, an actor-critic technique such as a proximal policy optimization (PPO) technique, an advantage actor critic (A2C) technique, and/or an asynchronous advantage actor critic (A3C) technique.

Figure 5:
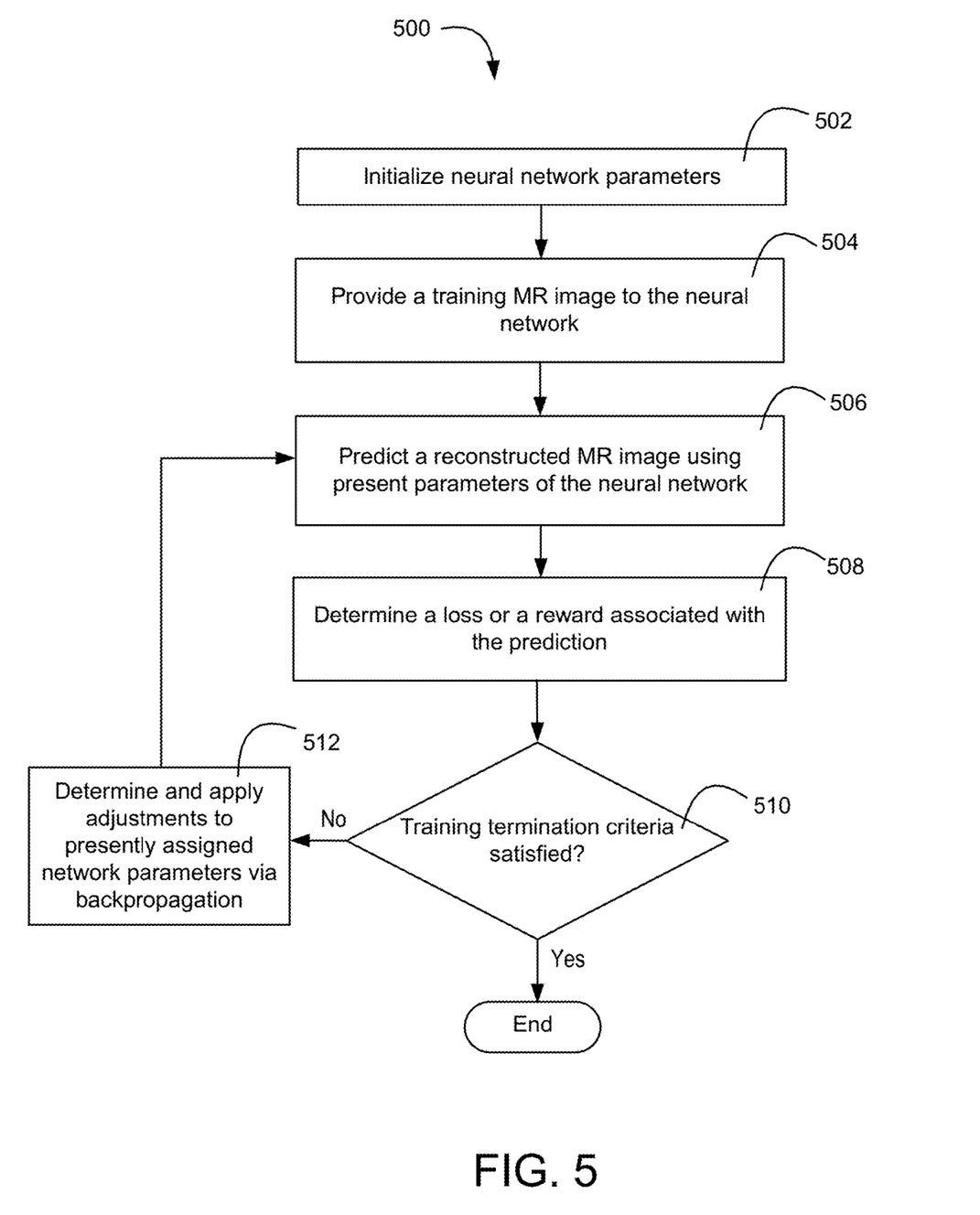
FIG. 5 is a simplified flow diagram illustrating an example process for training an artificial neural network to perform an MR image reconstruction task in accordance with one or more embodiments of the present disclosure.

FIG. 5 illustrates an example process 500 for training an artificial neural network (e.g., the MR reconstruction neural network and/or the reward neural network described herein) to perform one or more of the tasks described herein. As shown, training process 500 may include initializing parameters of the neural network (e.g., weights associated with various layers of the neural network) at 502, for example, based on samples from one or more probability distributions, parameter values of another neural network having a similar architecture, or parameter values obtained from previous training (e.g., training conducted in a supervised manner such as based on fully-sampled MR images as ground truth). The training process may further include processing an input training image (e.g., an under-sampled MR image) at 504 using presently assigned parameters of the neural network and making a prediction for a desired result (e.g., a reconstructed MR image) at 506.

The predicted result obtained at 506 may be evaluated at 508 based on a loss function (e.g., for the supervised training of the MR reconstruction neural network or the training of the reward neural network as described herein), or based on a reward (e.g., for the reinforcement training of the MR reconstruction neural network as described herein). The loss or reward associated with the reconstructed MR image may then be evaluated, at 510, to determine whether one or more training termination criteria are satisfied. For example, in cases where the loss is used as an objective (e.g., for the supervised training of the MR reconstruction neural network or the training of the reward neural network), the training termination criteria may be determined to be satisfied if the loss is below a threshold value or if a change in the loss between two training iterations falls below a threshold value. In cases where the reward is used as an objective (e.g., for the reinforcement training of the MR reconstruction neural network), the training termination criteria may be determined to be satisfied if the reward reaches a target reward value (e.g., a maximum reward value defined as part of a policy) or if a change in the reward between two training iterations falls below a threshold value.

If the determination at 510 is that the termination criteria are satisfied, the training may end. Otherwise, the presently assigned network parameters may be adjusted at 512, for example, by backpropagating a gradient descent of the loss (e.g., for the supervised training of the MR reconstruction neural network or the training of the reward neural network), or by backpropagating a gradient ascent of the reward (e.g., for the reinforcement training of the MR reconstruction neural network) through the network, before the training returns to 506.

For simplicity of explanation, the training operations are depicted and described herein with a specific order. It should be appreciated, however, that the training operations may occur in various orders, concurrently, and/or with other operations not presented or described herein. Furthermore, it should be noted that not all operations that may be included in the training process are depicted and described herein, and not all illustrated operations are required to be performed.

Figure 6:
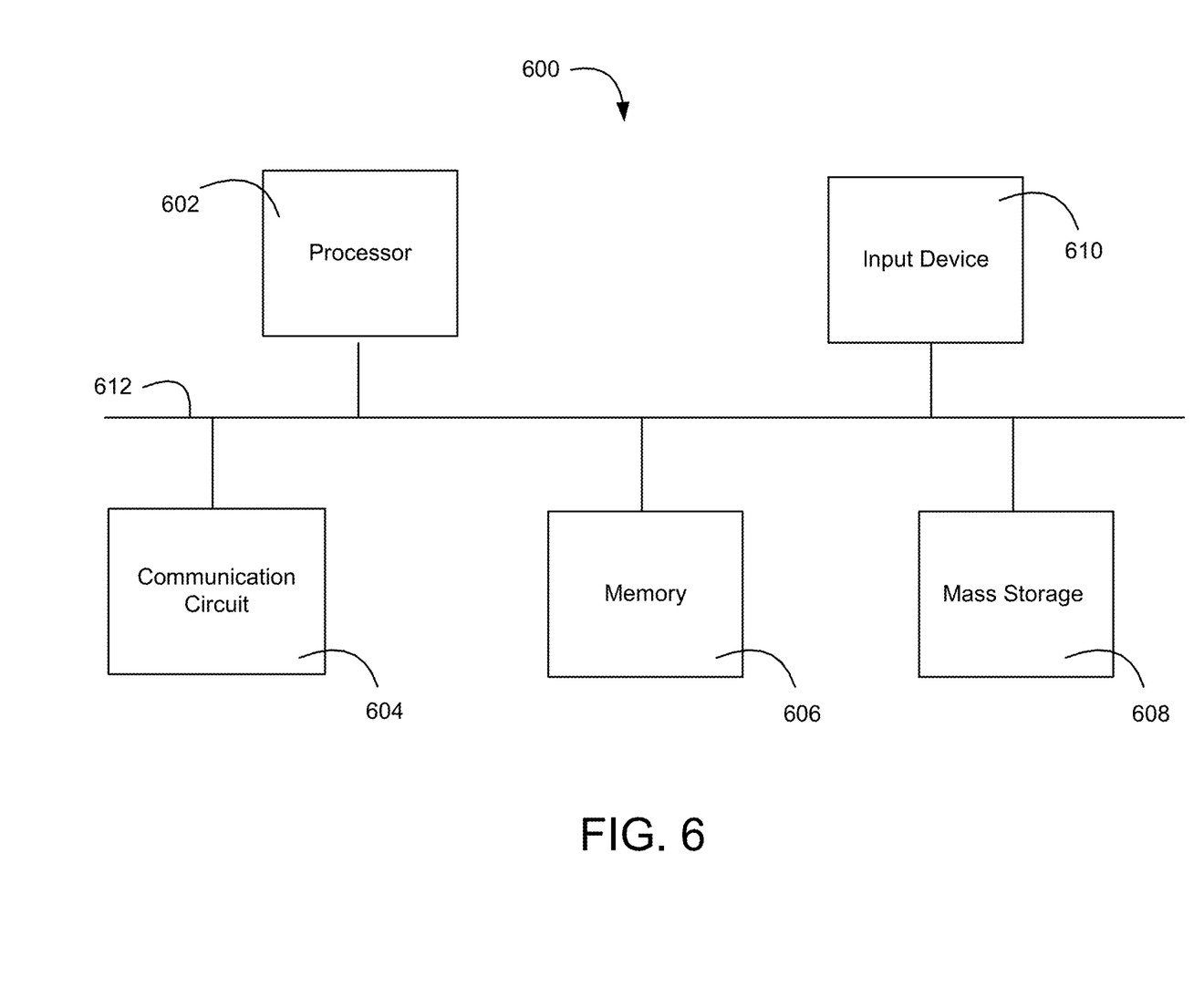
FIG. 6 is a simplified block diagram illustrating example components of an apparatus that may be configured to perform the MRI image reconstruction and/or refinement tasks described in one or more embodiments provided herein.

The systems, methods, and/or instrumentalities described herein may be implemented using one or more processors, one or more storage devices, and/or other suitable accessory devices such as display devices, communication devices, input/output devices, etc. FIG. 6 is a block diagram illustrating an example apparatus 600 that may be configured to perform the tasks described herein. As shown, apparatus 600 may include a processor (e.g., one or more processors) 602, which may be a central processing unit (CPU), a graphics processing unit (GPU), a microcontroller, a reduced instruction set computer (RISC) processor, application specific integrated circuits (ASICs), an application-specific instruction-set processor (ASIP), a physics processing unit (PPU), a digital signal processor (DSP), a field programmable gate array (FPGA), or any other circuit or processor capable of executing the functions described herein. Apparatus 600 may further include a communication circuit 604, a memory 606, a mass storage device 608, an input device 610, and/or a communication link 612 (e.g., a communication bus) over which the one or more components shown in the figure may exchange information.

Communication circuit 604 may be configured to transmit and receive information utilizing one or more communication protocols (e.g., TCP/IP) and one or more communication networks including a local area network (LAN), a wide area network (WAN), the Internet, a wireless data network (e.g., a Wi-Fi, 3G, 4G/LTE, or 5G network). Memory 606 may include a storage medium (e.g., a non-transitory storage medium) configured to store machine-readable instructions that, when executed, cause processor 602 to perform one or more of the functions described herein. Examples of the machine-readable medium may include volatile or non-volatile memory including but not limited to semiconductor memory (e.g., electrically programmable read-only memory (EPROM), electrically erasable programmable read-only memory (EEPROM)), flash memory, and/or the like. Mass storage device 608 may include one or more magnetic disks such as one or more internal hard disks, one or more removable disks, one or more magneto-optical disks, one or more CD-ROM or DVD-ROM disks, etc., on which instructions and/or data may be stored to facilitate the operation of processor 602. Input device 610 may include a keyboard, a mouse, a voice-controlled input device, a touch sensitive input device (e.g., a touch screen), and/or the like for receiving user inputs to apparatus 600.

It should be noted that apparatus 600 may operate as a standalone device or may be connected (e.g., networked, or clustered) with other computation devices to perform the functions described herein. And even though only one instance of each component is shown in FIG. 6, a skilled person in the art will understand that apparatus 600 may include multiple instances of one or more of the components shown in the figure.

While this disclosure has been described in terms of certain embodiments and generally associated methods, alterations and permutations of the embodiments and methods will be apparent to those skilled in the art. Accordingly, the above description of example embodiments does not constrain this disclosure. Other changes, substitutions, and alterations are also possible without departing from the spirit and scope of this disclosure. In addition, unless specifically stated otherwise, discussions utilizing terms such as "analyzing," "determining," "enabling," "identifying," "modifying" or the like, refer to the actions and processes of a computer system, or similar electronic computing device, that manipulates and transforms data represented as physical (e.g., electronic) quantities within the computer system's registers and memories into other data represented as physical quantities within the computer system memories or other such information storage, transmission or display devices.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. An apparatus, comprising:
   at least one processor configured to:
   obtain an under-sampled magnetic resonance (MR) image of an anatomical structure; and
   reconstruct the under-sampled MR image of the anatomical structure through multiple iterations based on a machine-learned (ML) image reconstruction model, wherein the ML image reconstruction model is learned through a training process and during the training process:
   the ML image reconstruction model is used to predict a correction to an input MR image obtained during at least one of the multiple iterations and generate a reconstructed MR image by applying the correction to the input MR image;
   an ML reward model is used to determine a reward for the reconstructed MR image generated using the ML image reconstruction model; and
   parameters of the ML image reconstruction model are adjusted based on the reward determined by the ML reward model, wherein, prior to being used in the training process of the ML image reconstruction model, the ML reward model is pre-trained for predicting a quality of an MR image and generating an evaluation for the MR image based on the predicted quality, the pre-training of the ML reward model is conducted based at least on a first MR training image, a second MR training image, and an indication that the second MR training image has a higher quality than the first MR training image, and the ML reward model is used during the pre-training to extract respective features from the first MR training image and the second MR training image and predict a quality of the first MR training image based on a difference between the respective features extracted from the first MR training image and the second MR training image.

2. The apparatus of claim 1, wherein, prior to being trained through the training process, the ML image reconstruction model is pre-trained based on under-sampled MR training images and corresponding fully-sampled MR images, and wherein initial parameters for the ML image reconstruction model are obtained based on the pre-training of the ML image reconstruction model.

3. The apparatus of claim 1, wherein, prior to being trained through the training process, the ML image reconstruction model is assigned random initial parameters.

4. The apparatus of claim 1, wherein the indication is received based on a human evaluation of the first MR training image and the second MR training image.

5. The apparatus of claim 1, wherein the input MR image obtained during the at least one of the multiple iterations is an output of a preceding iteration of the multiple iterations.

6. The apparatus of claim 1, wherein the ML image reconstruction model is trained to learn, through the training process, a probability distribution of the correction applied to the input MR image, and wherein the at least one processor is configured to reconstruct the under-sampled MR image based on a sample mean and a sample variance drawn from the probability distribution.

7. The apparatus of claim 1, wherein the ML image reconstruction model is trained to learn, through the training process, a mean of the correction applied to the input MR image, and wherein the at least one processor is configured to reconstruct the under-sampled MR image based at least on the mean of the correction.

8. The apparatus of claim 7, wherein the at least one processor is configured to reconstruct the under-sampled MR image further based on a constant variance applicable to the mean.

9. The apparatus of claim 1, wherein the correction comprises a map that includes a plurality of correction values to be applied to respective pixels of the input MR image.

10. The apparatus of claim 1, wherein the ML image reconstruction model is implemented via a recurrent neural network or a cascaded neural network.

11. A method for medical image processing, the method comprising:
    obtaining an under-sampled magnetic resonance (MR) image of an anatomical structure; and
    reconstructing the under-sampled MR image of the anatomical structure through multiple iterations based on a machine-learned (ML) image reconstruction model, wherein the ML image reconstruction model is learned through a training process and during the training process:
    the ML image reconstruction model is used to predict a correction to an input MR image obtained during at least one of the multiple iterations and generate a reconstructed MR image by applying the correction to the input MR image;
    an ML reward model is used to determine a reward for the reconstructed MR image generated using the ML image reconstruction model; and
    parameters of the ML image reconstruction model are adjusted based on the reward determined by the ML reward model, wherein, prior to being used in the training process of the ML image reconstruction model, the ML reward model is pre-trained for predicting a quality of an MR image and generating an evaluation for the MR image based on the predicted quality, the pre-training of the ML reward model is conducted based at least on a first MR training image, a second MR training image, and an indication that the second MR training image has a higher quality than the first MR training image, and the ML reward model is used during the pre-training to extract respective features from the first MR training image and the second MR training image and predict a quality of the first MR training image based on a difference between the respective features extracted from the first MR training image and the second MR training image.

12. The method of claim 11, wherein, prior to being trained through the training process, the ML image reconstruction model is pre-trained based on under-sampled MR training images and corresponding fully-sampled MR images, and wherein initial parameters for the ML image reconstruction model are obtained based on the pre-training of the ML image reconstruction model.

13. The method of claim 11, wherein the indication is received as a part of a human evaluation of the first MR training image and the second MR training image.

14. The method of claim 11, wherein the ML image reconstruction model is trained to learn, through the training process, a probability distribution of the correction applied to the input MR image, and wherein the under-sampled MR image is reconstructed based on a sample mean and a sample variance drawn from the probability distribution.

15. The method of claim 11, wherein the ML image reconstruction model is trained to learn, through the training process, a mean of the correction applied to the input MR image, and wherein the under-sampled MR image is reconstructed based at least on the mean of the correction.

16. A method for training a machine-learning (ML) image reconstruction model to reconstruct under-sampled magnetic resonance (MR) images, the method comprising:
    predicting, during at least one of multiple iterations, a correction to an input magnetic resonance (MR) image based on present parameters of the ML image reconstruction model;
    applying the predicted correction to the input MR image to obtain a reconstructed MR image;
    determining, based on an ML reward model, a reward for the reconstructed MR image; and
    adjusting the present parameters of the ML image reconstruction model based on the determined reward, wherein, prior to being used in the training of the ML image reconstruction model, the ML reward model is pre-trained for predicting a quality of an MR image and generating an evaluation for the MR image based on the predicted quality, the pre-training of the ML reward model is conducted based at least on a first MR training image, a second MR training image, and an indication that the second MR training image has a higher quality than the first MR training image, and the ML reward model is used during the pre-training to extract respective features from the first MR training image and the second MR training image and predict a quality of the first MR training image based on a difference between the respective features extracted from the first MR training image and the second MR training image.

* * * * *